Kerr, Grant & Potter. Sheet 1, 2 Sheets.
Iron Ship.
BEST AVAILABLE COPY
No. 56. A.I. Patented Oct. 14, 1842.
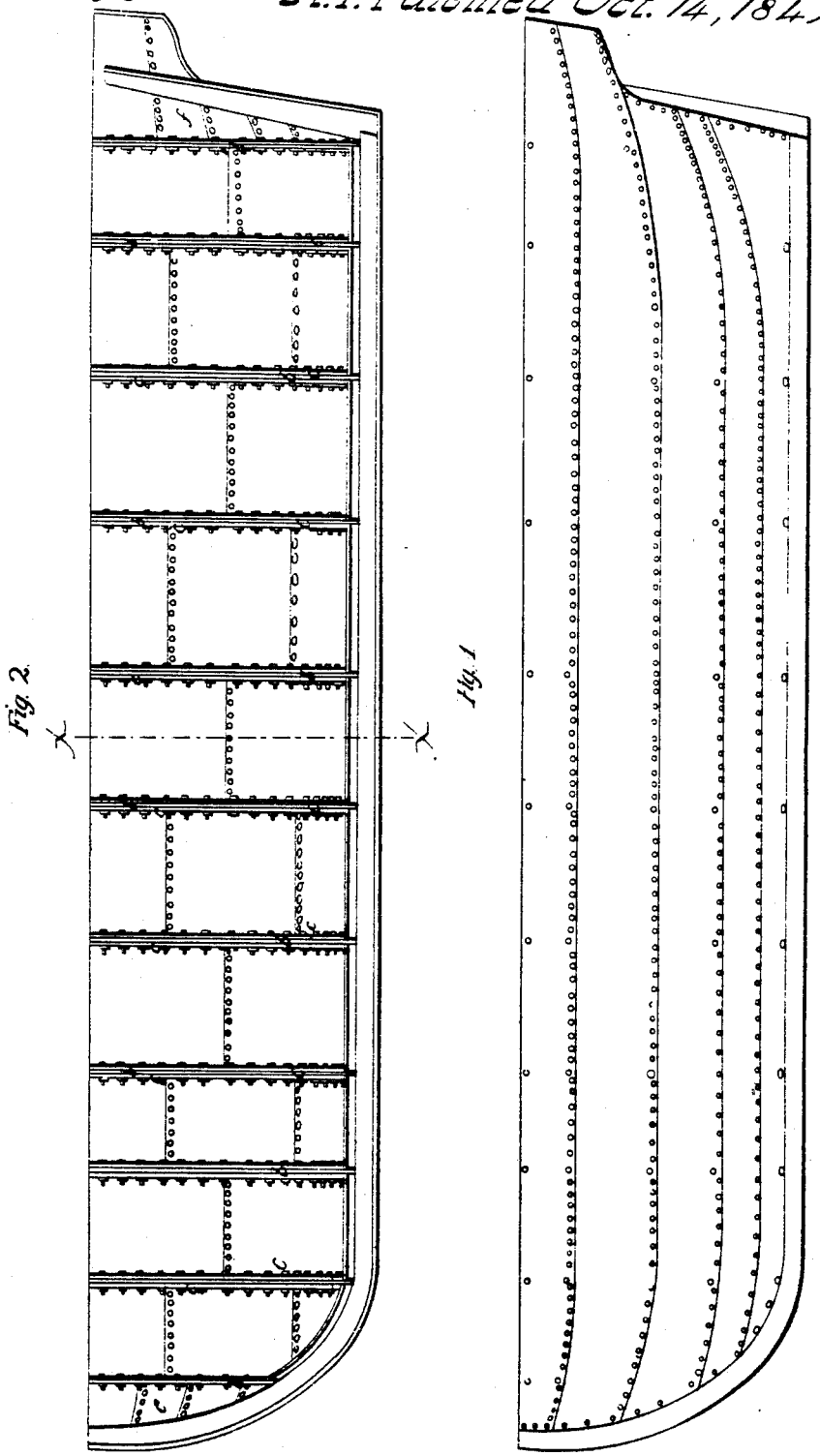
H. PETERS, PHOTO-LITHOGRAPHER, WASHINGTON, D. C.

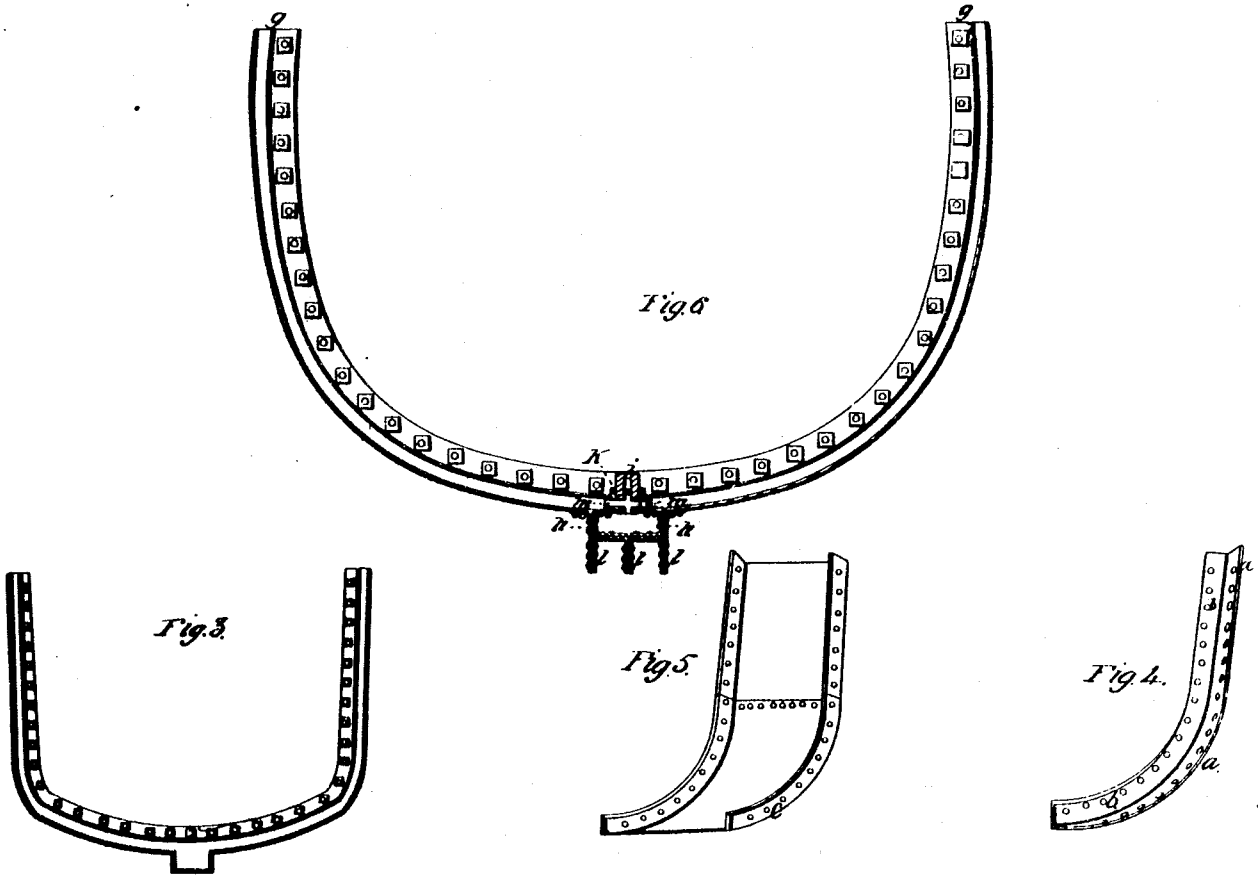

BEST AVAILABLE COPY
Kerr, Grant & Potter. Sheet 2, 2 Sheets
Iron Ship.
No. 56. A. I. Patented Oct. 14, 1842